United States Patent [19]

Polaert et al.

[11] Patent Number: 5,287,757
[45] Date of Patent: Feb. 22, 1994

[54] STRAIN-GAUGE TRANSDUCER

[75] Inventors: Rémy Polaert, Villecresnes;
Jean-Pierre Hazan, Sucy en Brie;
Francois Maniguet, Marles en Brie,
all of France

[73] Assignee: U.S. Philips Corporation, New York, N.Y.

[21] Appl. No.: 846,371

[22] Filed: Mar. 5, 1992

[30] Foreign Application Priority Data

Mar. 8, 1991 [FR] France .................. 91 02814

[51] Int. Cl.$^5$ .............................................. G01L 1/00
[52] U.S. Cl. ............................. 73/862.627; 177/211
[58] Field of Search ............... 73/161, 720, 862.627, 73/862.632, 862.634, 862.474, 862.637, 862.639, 720, 726; 177/211, 229

[56] References Cited

U.S. PATENT DOCUMENTS

| | | | |
|---|---|---|---|
| 3,548,650 | 12/1970 | Boadle | 73/862.632 |
| 4,175,445 | 11/1979 | Templeton, III | 73/862.632 |
| 4,355,692 | 10/1982 | Ostrelich | 177/211 |
| 4,433,741 | 2/1984 | Ryckman, Jr. | 177/211 |
| 4,498,070 | 2/1985 | Lirman | 73/720 |
| 4,650,016 | 3/1987 | Andriewsky | 177/211 |
| 4,874,051 | 10/1989 | Borchard | 177/229 |
| 5,088,334 | 2/1992 | Wirth | 177/229 |

FOREIGN PATENT DOCUMENTS 1001832 7/1953 Fed. Rep. of Germany .
8707019 11/1987 World Int. Prop. O. .

OTHER PUBLICATIONS

"Strain Sensitivity of Thick-Film Resistors" J. S. Shah, IEEE Trans. CHMT-3 No. 4, p. 554.

*Primary Examiner*—Richard E. Chilcot, Jr.
*Assistant Examiner*—R. L. Biegel
*Attorney, Agent, or Firm*—William L. Botjer

[57] ABSTRACT

A strain-gauge transducer comprises a strain gauge enclosed between pressure members which deform the strain gauge, the strain gauge comprising a plate-shaped substrate provided with strain-detection elements. At least one spring having a flexibility larger than that of the substrate is arranged between the strain gauge and at least one of the pressure members, said substrate and said spring being in contact with one another so as to be jointly subjected to deformations. The spring may be a blade spring, a helical spring, or a cylindrical buffer spring. The excursions of the pressure members can be limited by means of stops. In the case of a blade spring the contact between the substrate and the spring can be controlled by giving the substrate a toothed shape or by providing it with contact elements.

13 Claims, 4 Drawing Sheets

STRAIN-GAUGE TRANSDUCER

BACKGROUND OF THE INVENTION

The invention relates to a strain-gauge transducer comprising:

a strain gauge enclosed between pressure members, the strain gauge comprising a plate-shaped substrate provided with strain-detection elements, at least one spring arranged between said substrate and one of the pressure members so as to be deformed in conjunction with said substrate by pressures exerted by the pressure members.

Such a transducer is used for the detection or measurement of forces, in particular in force transducers. By means of these transducers it is possible to construct, for example, scales, load detectors etc.

In the analysis of the strength of materials it is known to place a sample on two supports and subsequently exert pressure on the other side of the sample in the middle of the two supports, use being made of its bending capacity. A similar device is utilised for measuring forces in transducers employing strain gauges formed by resistors arranged on a rigid substrate: two supports are fixedly connected to a first pressure member and the support arranged opposite thereto is fixedly connected to a second pressure member. This is described in, for example, "Strain sensitivity of thick-film resistors", J. S. SHAH, IEEE Trans. CHMT-3, no. 4, 1980, p. 554. The supports may be knife-edge supports. The knife-edge supports should be accurately parallel to one another, which requires accurate machining of the various elements.

A strain gauge generally comprises resistive elements whose resistance value varies with the deformation of the support on which they are arranged. Generally, several resistive elements are used which are connected in a Wheatstone bridge arrangement. In this way it is possible to obtain an electric signal which is directly proportional to the flexure of the support independently of temperature variations.

Thus, the document DE-B-1,001,832 describes a transducer element constructed as a symmetrical spring having two blades, of which one blade is provided with resistive elements, the deformation of the blade enabling pressure forces applied to the transducer element to be determined. The two blades are connected to one another in such a way that their deformations are equal and oppositely directed.

In order to ensure that the measurement by means of a transducer is linear and accurate the support which is used should have reproducible and linear mechanical properties. This is an advantage of gauges formed by a ceramic plate on which a resistive ink is deposited by screen-printing. Indeed, the ceramic plate has a very large elasticity range, which is limited only by the breaking point of the ceramic plate itself. There is neither plastic deformation nor hysteresis. For operation near the breaking point a means is required which prevents this point from being overstepped.

On the other hand, a strain-gauge transducer is mainly intended for use in consumer applications, for example in scales or all kinds of force transducers. For such consumer applications perfectly machined elements cannot be used for reasons of cost. This leads to the use of elements of imperfect flatness, parallelism and structure. The technologies used should therefore be free from the restraints associated with large series, in particular spreads of mechanical tolerances of the parts. It is to be noted that for the ceramic plates used the deflection to be utilised is small. Moreover, the ceramic plates for mass-production uses are commercially available plates, which are generally non-polished and have a surface roughness or a curvature which may be even of the order of magnitude of the deflection amplitude. The mechanical tolerances are not constant from plate to plate. An adjustment may be correct for one plate and may be destructive or lead to inadequate deflection amplitudes for another plate. In practice, it is therefore difficult to limit or adjust the maximum deflection that can be handled by such a plate so as to obtain a correct operation without breaking.

SUMMARY OF THE INVENTION

The problem to be solved is therefore, using standard ceramic plates, to construct strain-gauge transducers having reproducible characteristics which are not dependent upon variable mechanical tolerances of the plates. These variable tolerances include the roughness, the curvature, the thickness, the flexibility.

This is solved in that said substrate exclusively bears on said spring in a floating arrangement, said spring having a flexibility larger than that of the substrate.

Preferably, the spring is a curved blade spring, because this is very suitable for large-scale production. Thus, the substrate which is subjected to the action of an applied force will deform, thereby compressing the curved blade spring supporting it, as a result of which this spring is deformed. Owing to the compression of this spring the substrate is situated closer to one of the pressure members. It is necessary that the flexibility of the substrate and that of the curved blade spring are such that they both deform, the spring being deformed to a larger extent that the substrate. The flexibility of the spring and of the substrate should be such that the substrate cannot reach its breaking point when the maximum excursion is reached. These excursions are limited by stops.

A curved blade spring has a concave surface and a convex surface. The substrate can be in contact with either surface of the spring.

When the substrate is arranged at the side of the concave surface of said spring the edges of this substrate are in contact with the spring. The edges may be provided with contact elements. Alternatively, the spring may be of the helical type or of the cylindrical buffer type.

Suitably, according to the invention, the deformation of small amplitude of a deformed substrate is combined with a deformation of larger amplitude of a spring. In this way nearly the entire range of deformation of the substrate can be utilised without its breaking point being overstepped.

In all these situations the excursions can be limited by means of stops, which may be arranged on the substrate or on the spring or on at least one pressure member. This enables the transducer to be loaded well beyond the breaking load of the substrate without the substrate being broken.

BRIEF DESCRIPTION OF THE DRAWING

The invention will now be described in more detail, by way of non-limitative example, with reference to the following Figures, of which.

DETAILED DESCRIPTION OF THE PREFERRED EMBODIMENTS

Figure 1:
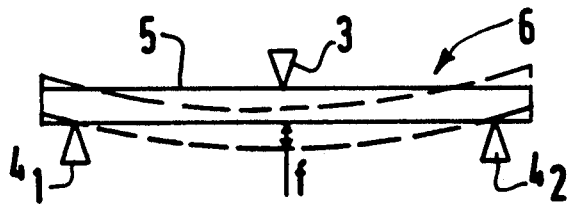
FIG. 1 is a diagrammatic representation of a prior-art device.

FIG. 1 shows diagrammatically a prior-art device in which a substrate 5 of a strain gauge 6 is arranged on two lower knife edges $4_1$, $4_2$, a pressure force being applied by an upper knife edge 3. Under the influence of the force the substrate is bent and exhibits a deflection f. In the case of fairly stiff substrates such as for example ceramic plates this deflection is comparatively small of the order of $5.10^2$ mm. In order to prevent the ceramic plate from breaking under the influence of excessive forces the value of said deflection should be limited.

However, these ceramic plates, which are often made of sintered aluminium, have a surface roughness and a curvature of substantially the same order of magnitude as the deflection f. Therefore, very thin stops have to be used in order to limit the deflection of the plate. In view of the differences in curvature this is found to be very difficult in practice because the spreads in mechanical properties of the plates can be very large. Thus, it is evident that it is very difficult to control the deflection limits, for if the emphasis is placed on the breaking point of the plate not being overstepped it is not unlikely that the excursion becomes too small to carry out strain measurements. If the emphasis is placed on the range of the excursion the breaking point may be reached for certain plates and the plate may break.

Since the transducer in accordance with the invention is intended for the use of ceramic plates without prior surface treatment these problems have to be solved.

Figure 2:
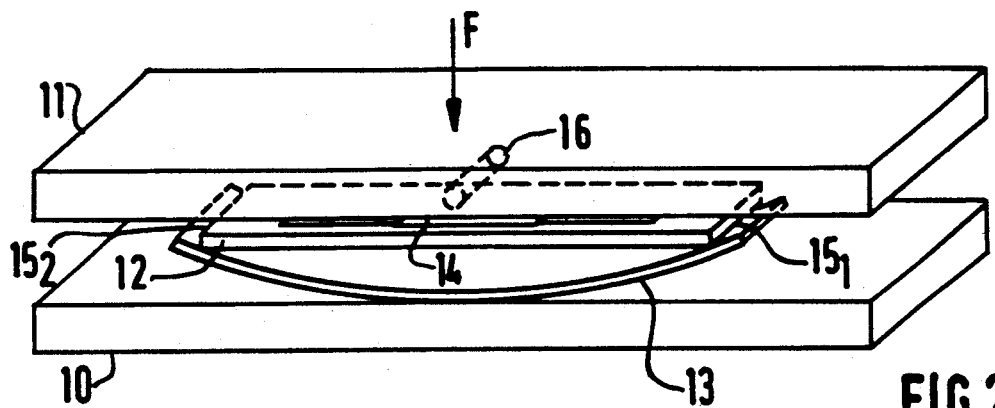
FIG. 2 shows a first type of strain-gauge transducer in a first embodiment of the invention.

FIG. 2 shows a first type of transducer in accordance with the invention in which the spring is constituted by a curved blade. This transducer comprises two pressure members 10, 11 which are subjected to a pressure force F. This force is transmitted to a strain gauge which is supported on a curved blade spring 13. The strain gauge comprises a substrate 12 in the form of a plate (hereinafter referred to as "substrate") carrying the strain detection elements, for example the resistor 14. A plurality of such elements have been arranged on the surface of the substrate. For reasons of sensitivity to strain and immunity to temperature variations these detection elements are generally arranged as a Wheatstone bridge.

In a first embodiment of this first type of transducer shown in FIG. 2 the substrate is supported on the concave surface of the blade spring. It is floating, i.e. the ends of the substrate 12 and of the spring 13 are not connected to one another. Moreover, the substrate 12 bears only on the spring 13. Consequently, the substrate bears on the spring 13 with edges $15_1$, $15_2$.

The pressure member 11 transmits the applied force F by means of an element 16 which may:

act substantially in a point, for example via a ball or a part having a small contact surface, or act over a certain length in a direction perpendicular to the longitudinal direction of the substrate, for example via a pin, which may be cylindrical in order to eliminate the effect of flatness deviations, or act in the above direction and in a direction perpendicular thereto over a certain length, for example by means of two cylindrical pins fixed to one another and forming a cross. This eliminates the effect of flatness deviations in two directions.

This element 16 transmits the force F applied substantially to the centre of the substrate so as to act oppositely to the two edges $15_1$, $15_2$ bearing on the spring 13. Under the influence of the force F the substrate 12 of the strain gauge will deflect but this also causes the spring 13 to be flattened on the pressure member 10. The flexibility of the spring 13 is selected in such a way that the substrate cannot break when flattening ceases, the substrate then bearing on a central point of support.

Figure 3:
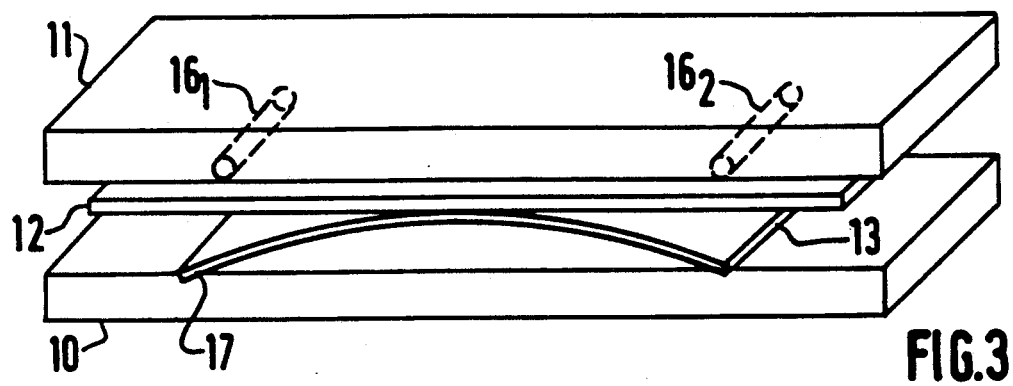
FIG. 3 shows a first type of strain-gauge transducer in a second embodiment of the invention.

FIG. 3 shows a second embodiment of this first type of transducer in which the substrate 12 bears on the convex surface of the spring 13. In this case the pressure member 11 applies the pressure force F to the substrate 12 by means of two elements $16_1$, $16_2$, arranged near the ends of the substrate 12. Thus, the reaction force of the spring 13 on the substrate 12 opposes the forces acting on the substrate 12 via the elements $16_1$, $16_2$. In the same way as above the flexibility of the substrate and the spring are selected in such a way that the substrate cannot break. One of the ends of the spring 13 can be mounted in a recess 17 formed in the pressure member 10. Any other equivalent mounting method is suitable.

In operation the pressure members 10, 11 can move relative to one another. They should be movable in the direction of the excursion and be held in position in the other directions. This can be achieved, for example, by means of guides (not shown).

In accordance with the invention the maximum deflection of the substrates 12 without breaking is not controlled directly. It is controlled indirectly by controlling the maximum excursion of the spring 13 when it is flattened by the substrate. This is achieved by means of stops.

Figure 4A:
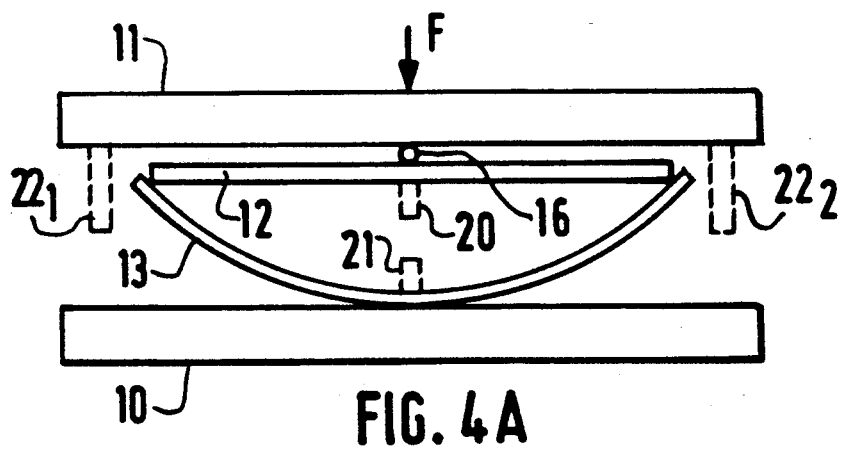
FIG. 4A, 4B show different possibilites of arranging the stops in the first and the second embodiment.

FIG. 4A relates to the first embodiment shown in FIG. 2. Similar elements bear the same reference numerals. FIG. 4A by way of example shows three possibilities of arranging the stops. Preferably, these three possibilities should be used independently of one another.

A first possibility is to arrange a stop 20 underneath the substrate 12 substantially in its centre. Thus, when the force F is applied the maximum deflection of the substrate 12 and the maximum flattening of the spring 13 are reached simultaneously when the stop 20 comes into contact with the concave surface of the spring 13.

A second possibility is to arrange a stop 21 on the concave surface of the spring 13 substantially in its centre. The above maximum limits are now reached when the stop 21 comes into contact with the substrate 12.

A third possibility is to arrange two stops $22_1$, $22_2$ on one of the pressure members, for example the pressure member 11. The advantage of this arrangement is that in the case of overloading no additional stress is transmitted to the substrate itself.

For each of these possibilities the size of the stops depends on the flexibility of the substrate 12 and of the spring 13 and on the distance between the pressure members 10, 11. The size of the stops then remains the same for batches of substrates and springs having substantially homogeneous properties.

Figure 4B:
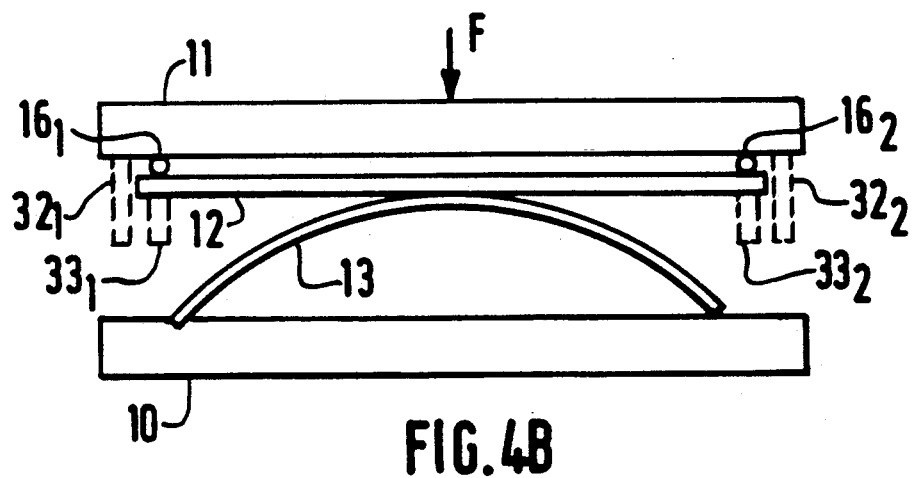

FIG. 4B relates to the second embodiment shown in FIG. 3. In a manner similar to that described for FIG. 4A it is possible to use:
- two stops $32_1$, $32_2$ arranged on one of the pressure members, for example the pressure member 11, externally of the substrate 12, or
- two stops $33_1$, $33_2$ arranged at the ends of the substrate 12 which come into contact with the pressure member 10 when flattening is maximal. Preferably, the stops $33_1$, $33_2$ are arranged opposite the elements $16_1$, $16_2$ on the opposite surface of the substrate 12.

All the stops may be separate parts secured by, for example, gluing or welding. They may also be integral with the element to which they belong.

Figure 5A:
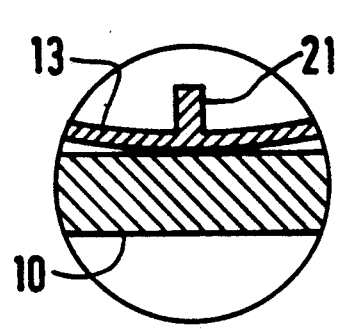
FIG. 5A, 5B show two methods of mounting the stops.
Figure 5B:
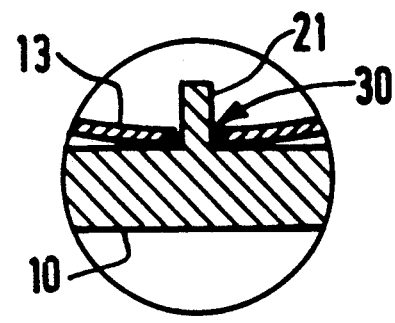

Thus, the stop 21 shown in FIG. 4A may be constructed for example as shown diagrammatically in FIG. 5A. In this case the stop is a stop 21 which is integral with the spring 13. Another construction may be, for example, as shown diagrammatically in FIG. 5B. In this case the stop is a stop 21 secured to the pressure member 10, said stop 21 traversing a hole 30 formed in the spring 13. Alternatively, the stop 21 may be constituted by a screw fitted in the pressure member 10 to adjust the length of the stop.

A use of a strain-gauge transducer in accordance with the invention is, for example, to detect the weight of loads placed on the transducer. Determining this weight should be possible over a certain weight range. If the load placed on the transducer exceeds this range the transducer should not break down. An example of such a use is in cook-tops provided with strain gauges. The applied force F can be a weight or a pressure force.

It has been found that the maximum permissible deflection in the case of a ceramic substrate is very small. A substrate of $31 \times 16 \times 1$ mm arranged on two supports spaced 25 mm apart has a maximum deflection of $5.10^{-2}$ mm for a weight of 10 kg in the centre. When the invention is not used and allowance is made for surface irregularities and warping it is found to be difficult to provide each substrate with the stops necessary for limiting the deflection to a maximum of $5.10^{-2}$ mm:
- either this leads to problems in manufacturing the stops, which is not permissible in mass-production,
- or the amounts of adhesive/solder cannot be measured out correctly.

Owing to the invention these problems are overcome by means of a curved blade spring of, for example, spring steel, of CHRYSOCAL, or of any other material having suitable elastic properties. For example, in combination with the above ceramic substrate a spring-steel blade spring is used having a radius of curvature of 240 mm in its no-load condition and having such an elasticity that the deflection in the centre is approximately 0.5 mm when the spring bearing on two supports spaced 31 mm apart is loaded by a weight of 10 kg. In the present example the ratio between the flexibility of the spring and of the substrate will be approximately 10.

With such an arrangement special stops are not indispensable because for a load equal to or above 10 kg the blade spring is almost completely flattened and the substrate comes into contact with the spring.

Figure 6:
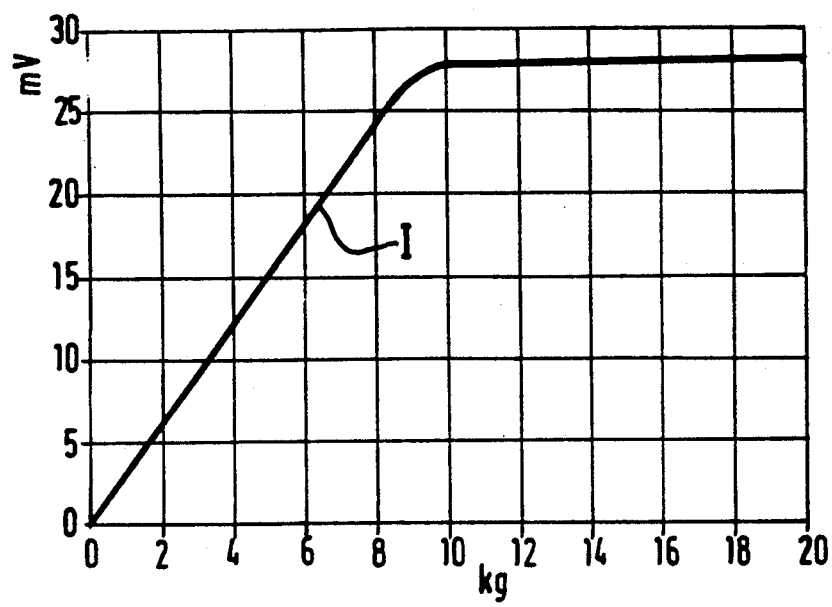
FIG. 6 is a curve representing the variation of the sensitivity of a transducer as a function of the applied load in a first embodiment.

The curve I representing the sensitivity of such a transducer (FIG. 2) is shown in FIG. 6 in which the weight in kg of the applied load is plotted along the horizontal axis and the electric signal supplied by the strain gauge arranged on the substrate is plotted along the vertical axis. It appears that the curve I has two parts: a linearly rising part approximately between weights from 0 to 8 kg and a constant part approximately between weights of 10 to 20 kg. The transition zone between these two parts at approximately 9 kg relates to the load necessary to bring the substrate into contact with the spring. The electric signal supplied by the gauge between 0 and 8 kg is perfectly proportional to the weight. This signal becomes constant when the substrate comes into contact with the spring. Thus, the transducer can be overloaded without the ceramic substrate being broken. The position of the transition zone is reproducible from one substrate to the other and does not depend on surface irregularities of the substrate. This transition zone is dependent upon the reproducibility of the elastic deformation of the spring. In fact, the deflection of the spring is approximately 10 times as large as that of the substrate. Thus, it is the reproducibility of the spring characteristics which enables the load limit to be determined precisely.

In FIG. 2 the substrate 12 and the spring 13 are in contact at the edges $15_1$, $15_2$ of the substrate. In operation it is possible that one edge of the substrate is not in contact all along the edge but only along a part of the edge or even in one point. When the quality of the contact along parts of the two edges of the substrate is considered it is evident that these parts can move along the respective edges when the load is varied. This may lead to a linearity error for small loads.

Figure 7:
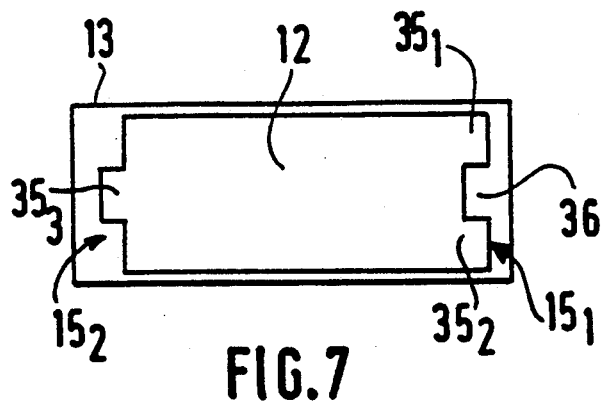
FIG. 7 diagrammatically shows toothed edges of the substrate.

FIG. 7 shows how to correct this error. It is a plan view showing the spring 13 with which the substrate 11 is in contact at the edges $15_1$, $15_2$. In order to ensure a good linearity the edges are toothed, the edge $15_1$ having two teeth $35_1$, $35_2$ separated by a gap 36 and the edge $15_2$ having one tooth $35_3$ so that the substrate 12 bears on the spring 13 at three points. Thus, the teeth $35_1$, $35_2$, $35_3$ ensures a satisfactory reproducibility of the linearity curve from one transducer to the other.

Figure 8A:
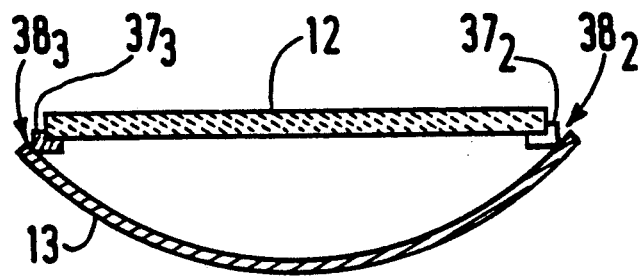
FIGS. 8A, 8B show a substrate provided with contact elements in sectional view and in plan view.
Figure 8B:
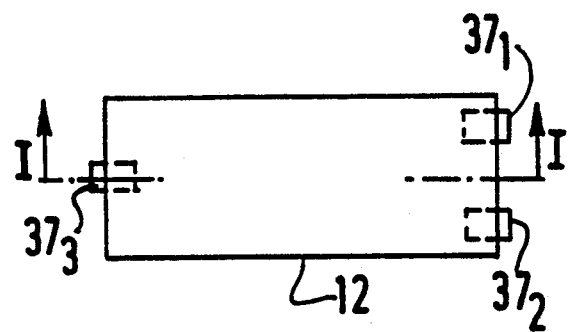

In order to provide a correct support and a good linearity the substrate can be supported on contact elements. This is illustrated in FIGS. 8A, 8B. The substrate 12 and the contact elements in FIG. 8A are shown in a sectional view taken on the line I—I in FIG. 8B. Three contact elements $37_1$, $37_2$, $37_3$ are arranged at apposite sides of the substrate for a stable balance. Preferably, these contact elements correspond in shape to the edge of the substrate in order to engage with the substrate along the edge. Thus, in operation the contact points $38_1$, $38_2$, $38_3$ are movable on the curved blade spring.

Figure 9:
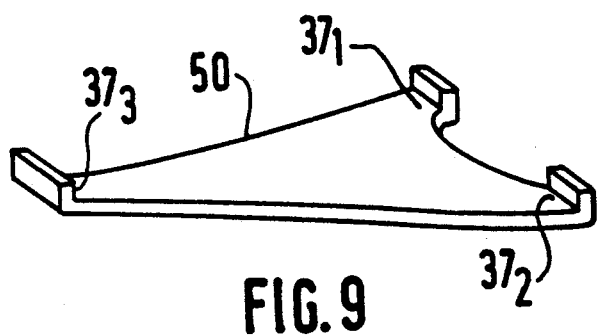
FIG. 9 diagrammatically shows a mounting provided with contact elements.

Said contact elements may be secured to the substrate 12 by means of an adhesive or by any other means. It is possible to connect the elements to one another. Thus, they may form part of a mounting 50 shown in FIG. 9, which mounting comprises three contact elements $37_1$, $37_2$, $37_3$ interconnected by a web or ribs or any other coupling element. This mounting 50 should be slightly curved in such a way that the substrate 12 and the mounting 50 are in contact via the contact elements.

Figure 10A:
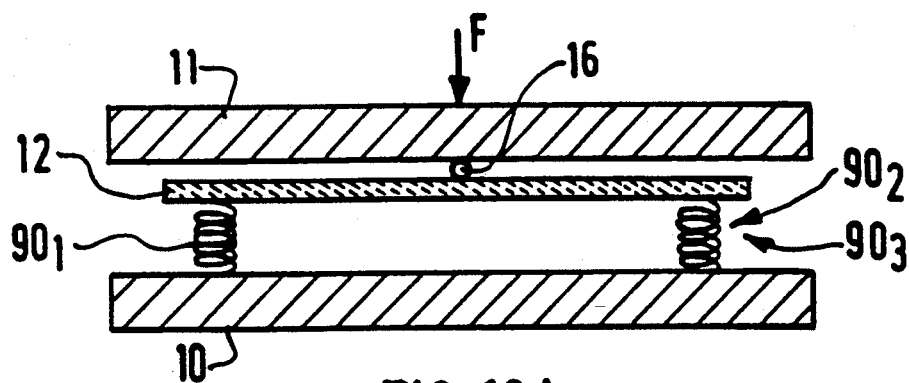
FIGS. 10A, 10B show a second type of strain-gauge transducer in accordance with the invention.
Figure 10B:
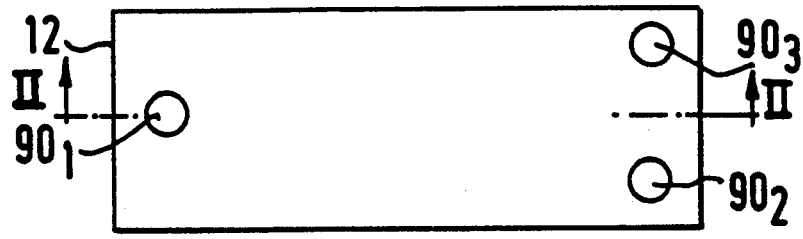

FIGS. 10A, 10B show a second type of transducer in accordance with the invention. Similar elements bear the same reference numerals. A part of FIG. 10A corresponds to a sectional view taken on the line II—II in FIG. 10B. The curved blade spring is replaced by springs which are subjected to deformations along their axes. The springs may be, for example, helical springs $90_1$, $90_2$, $90_3$. The flexibility of the springs is also selected in such a way that the range of deformation of the springs is larger than the range of deformation of the substrate. Preferably, three springs are used, two springs being arranged at one end of the substrate and one spring being arranged at the other end in order to define a stable seating. It is possible to use an arrangement with two springs (one at each side) or four springs (two at each side). The helical springs may be replaced by cylindrical buffer-type springs.

We claim:

1. A strain-gauge transducer comprising:
   a strain gauge enclosed between pressure members, the strain gauge including a plate-shaped substrate provided with strain-detection elements,
   at least one spring disposed between said substrate and one of the pressure members so as to be deformed in conjunction with said substrate by force exerted by the pressure members wherein said substrate exclusively contacts said spring in an arrangement such that the substrate is not connected to the spring, said spring having a flexibility larger than that of the substrate.

2. A transducer as claimed in claim 1, wherein the spring is a curved blade spring.

3. A transducer as claimed in claim 1, said substrate being subject to movement relative to at least one of the pressure members wherein said movement is limited by stops which prevent the substrate from breaking.

4. A transducer as claimed in claim 2, wherein said curved blade spring has a concave surface or a convex surface, edges of said substrate being in contact with said spring at the side of said concave surface.

5. A transducer as claimed in claim 4, wherein, for limiting the movement of said substrate towards said spring, at least one stop is arranged either on at least one of a central part of said substrate and on a central part of said spring, the two central parts facing each other.

6. A transducer as claimed in claim 4, wherein, for limiting the movement of said substrate towards said spring, a hole is formed in a central part of said spring to allow the passage of a stop arranged on the pressure member supporting said spring.

7. A transducer as claimed in claim 4 wherein of said substrate which are in contact with said spring have a toothed shape.

8. A transducer as claimed in claim 4 wherein the edges of said substrate are in contact with said spring by means of contact elements.

9. A transducer as claimed in claim 8, wherein the contact elements are interconnected.

10. A transducer as claimed in claim 1, wherein the curved blade spring has a concave surface and a convex surface, a central part of said substrate being in contact with a central part of said spring at the side of the convex surface.

11. A transducer as claimed in claim 10, wherein at least one stop is arranged on at least one of the end portions of the substrate and one of the pressure members.

12. A transducer as claimed in claim 1, wherein the spring is a helical spring.

13. A transducer as claimed in claim 12, wherein said substrate is subject to movement relative to at least one of the pressure members, said movement being limited by stops arranged on at least one of the pressure members and the substrate.

* * * * *